(12) United States Patent
Ishii

(10) Patent No.: US 7,561,220 B2
(45) Date of Patent: Jul. 14, 2009

(54) ELECTRO-OPTICAL DEVICE AND MANUFACTURING METHOD THEREOF, ELECTRONIC APPARATUS, AND CAPACITOR

(75) Inventor: Tatsuya Ishii, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 125 days.

(21) Appl. No.: 11/482,425

(22) Filed: Jul. 7, 2006

(65) Prior Publication Data

US 2007/0058100 A1    Mar. 15, 2007

(30) Foreign Application Priority Data

Sep. 15, 2005   (JP)   ............................. 2005-268606

(51) Int. Cl.
  *G02F 1/136*   (2006.01)
(52) U.S. Cl. .......................................... 349/43; 349/56
(58) Field of Classification Search ............. 349/47–48, 349/162, 55
  See application file for complete search history.

(56) References Cited

U.S. PATENT DOCUMENTS

| 4,378,630 | A | * | 4/1983 | Horng et al. ................. 438/327 |
| 4,433,470 | A | * | 2/1984 | Kameyama et al. ......... 438/323 |
| 4,772,569 | A | * | 9/1988 | Ishii et al. .................... 438/445 |
| 4,826,781 | A | * | 5/1989 | Asahina et al. .............. 438/243 |
| 4,849,279 | A | * | 7/1989 | Toyama et al. ............... 442/125 |
| 4,855,953 | A | * | 8/1989 | Tsukamoto et al. ......... 365/149 |
| 4,884,121 | A | * | 11/1989 | Ishii ............................. 257/626 |
| 4,894,695 | A | * | 1/1990 | Ishii et al. .................... 257/301 |
| 4,970,580 | A | * | 11/1990 | Ishii ............................. 257/302 |
| 4,985,368 | A | * | 1/1991 | Ishii et al. .................... 438/248 |
| 5,008,218 | A | * | 4/1991 | Kawachi et al. .............. 438/30 |
| 5,010,379 | A | * | 4/1991 | Ishii ............................. 257/305 |
| 5,025,294 | A | * | 6/1991 | Ema ............................. 257/296 |
| 5,053,351 | A | * | 10/1991 | Fazan et al. .................. 438/240 |
| 5,086,322 | A | * | 2/1992 | Ishii et al. .................... 257/327 |
| 5,112,771 | A | * | 5/1992 | Ishii et al. .................... 438/389 |
| 5,118,640 | A | * | 6/1992 | Fujii et al. ................... 438/396 |
| 5,227,855 | A | * | 7/1993 | Momose ...................... 365/145 |
| 5,243,209 | A | * | 9/1993 | Ishii ............................. 257/263 |
| 5,250,831 | A | * | 10/1993 | Ishii ............................. 257/354 |

(Continued)

FOREIGN PATENT DOCUMENTS

JP          11-016909  A       1/1999

(Continued)

*Primary Examiner*—Frank G Font
*Assistant Examiner*—Peter Radkowski
(74) *Attorney, Agent, or Firm*—AdvantEdge Law Group, LLC

(57) ABSTRACT

An electro-optical device includes, on a substrate, a plurality of scanning lines and a plurality of data lines which intersect one another, a plurality of pixel electrodes provided corresponding to the intersections of the plurality of scanning lines and the plurality of data lines, a storage capacitor in which a pair of electrodes, and a dielectric film are laminated, a sidewall made of a first insulating film provided on an inner wall of an opening which is opened through one of the pair of electrodes and the dielectric film, and a first conductive film which is arranged opposite to one of the pair of electrodes as viewed from the other of the pair of electrodes, and electrically connected to the other of the pair of electrodes via a self-alignment contact hole which is formed in a self-alignment manner simultaneously with the sidewall and surrounded by the sidewall.

5 Claims, 11 Drawing Sheets

U.S. PATENT DOCUMENTS

| | | | | |
|---|---|---|---|---|
| 5,287,205 | A * | 2/1994 | Yamazaki et al. | 349/174 |
| 5,289,030 | A * | 2/1994 | Yamazaki et al. | 257/410 |
| 5,334,540 | A * | 8/1994 | Ishii | 324/765 |
| 5,359,221 | A * | 10/1994 | Miyamoto et al. | 257/408 |
| 5,389,873 | A * | 2/1995 | Ishii et al. | 324/158.1 |
| 5,393,998 | A * | 2/1995 | Ishii et al. | 257/256 |
| 5,463,235 | A * | 10/1995 | Ishii | 257/300 |
| 5,470,777 | A * | 11/1995 | Nagata et al. | 438/241 |
| 5,493,236 | A * | 2/1996 | Ishii et al. | 324/752 |
| 5,508,541 | A * | 4/1996 | Hieda et al. | 257/301 |
| 5,521,407 | A * | 5/1996 | Kohyama et al. | 257/301 |
| 5,633,781 | A * | 5/1997 | Saenger et al. | 361/321.4 |
| 5,675,172 | A * | 10/1997 | Miyamoto et al. | 257/402 |
| 5,717,236 | A * | 2/1998 | Shinkawata | 257/306 |
| 5,734,177 | A * | 3/1998 | Sakamoto | 257/49 |
| 5,736,760 | A * | 4/1998 | Hieda et al. | 257/301 |
| 5,742,472 | A * | 4/1998 | Lee et al. | 361/321.4 |
| 5,747,845 | A * | 5/1998 | Iwasa | 257/306 |
| 5,867,428 | A * | 2/1999 | Ishii et al. | 365/185.24 |
| 5,914,851 | A * | 6/1999 | Saenger et al. | 361/311 |
| 5,920,082 | A * | 7/1999 | Kitazawa et al. | 257/59 |
| 5,982,668 | A * | 11/1999 | Ishii et al. | 365/185.24 |
| 5,990,507 | A * | 11/1999 | Mochizuki et al. | 257/295 |
| 6,009,016 | A * | 12/1999 | Ishii et al. | 365/185.24 |
| 6,023,425 | A * | 2/2000 | Ishii et al. | 365/185.24 |
| 6,060,346 | A * | 5/2000 | Roh et al. | 438/200 |
| 6,121,649 | A * | 9/2000 | Kunishima | 257/295 |
| 6,157,573 | A * | 12/2000 | Ishii et al. | 365/185.24 |
| 6,226,212 | B1 * | 5/2001 | Sakamoto et al. | 365/207 |
| 6,243,313 | B1 * | 6/2001 | Sakamoto et al. | 365/207 |
| 6,262,783 | B1 * | 7/2001 | Tsuda et al. | 349/39 |
| 6,265,249 | B1 * | 7/2001 | Wu | 438/158 |
| 6,313,491 | B1 * | 11/2001 | Shuto | 257/295 |
| 6,385,092 | B1 * | 5/2002 | Ishii et al. | 365/185.24 |
| 6,392,932 | B1 * | 5/2002 | Ishii et al. | 365/185.24 |
| 6,429,069 | B1 * | 8/2002 | Dennison et al. | 438/253 |
| 6,429,473 | B1 * | 8/2002 | Cronin et al. | 257/296 |
| 6,452,838 | B1 * | 9/2002 | Ishii et al. | 365/185.24 |
| 6,461,633 | B1 * | 10/2002 | Kawakami et al. | 424/439 |
| 6,473,321 | B2 * | 10/2002 | Kishimoto et al. | 363/59 |
| 6,495,386 | B2 * | 12/2002 | Powell | 438/48 |
| 6,567,311 | B2 * | 5/2003 | Ishii et al. | 365/185.24 |
| 6,586,793 | B2 * | 7/2003 | Imai et al. | 257/295 |
| 6,587,523 | B1 * | 7/2003 | Ishii | 375/344 |
| 6,606,347 | B1 * | 8/2003 | Ishii | 375/144 |
| 6,620,672 | B1 * | 9/2003 | Dennison et al. | 438/239 |
| 6,660,549 | B2 * | 12/2003 | Yamazaki et al. | 438/30 |
| 6,683,811 | B2 * | 1/2004 | Ishii et al. | 365/185.24 |
| 6,767,789 | B1 * | 7/2004 | Bronner et al. | 438/254 |
| 6,772,856 | B2 * | 8/2004 | Ishii | 181/210 |
| 6,778,231 | B1 * | 8/2004 | Yamazaki et al. | 349/43 |
| 6,788,575 | B2 * | 9/2004 | Kozakai et al. | 365/185.09 |
| 6,815,960 | B2 * | 11/2004 | Ishii | 324/751 |
| 6,816,210 | B2 * | 11/2004 | Chen | 349/44 |
| 6,822,261 | B2 * | 11/2004 | Yamazaki et al. | 257/59 |
| 6,839,646 | B2 * | 1/2005 | Ishii | 702/117 |
| 6,858,890 | B2 * | 2/2005 | Jacob et al. | 257/296 |
| 6,868,032 | B2 * | 3/2005 | Kozakai et al. | 365/230.03 |
| 6,873,552 | B2 * | 3/2005 | Ishii et al. | 365/185.24 |
| 6,954,416 | B1 * | 10/2005 | Ishii | 369/68 |
| 6,985,522 | B2 * | 1/2006 | Ishii | 375/229 |
| 6,995,050 | B2 * | 2/2006 | Chen et al. | 438/154 |
| 7,012,845 | B2 * | 3/2006 | Kozakai et al. | 365/200 |
| 7,072,222 | B2 * | 7/2006 | Ishii et al. | 365/185.24 |
| 7,145,805 | B2 * | 12/2006 | Ishii et al. | 365/185.24 |
| 7,175,911 | B2 * | 2/2007 | Zhou et al. | 428/403 |
| 7,230,859 | B2 * | 6/2007 | Kozakai et al. | 365/189.05 |
| 7,253,463 | B2 * | 8/2007 | Yamada | 257/295 |
| 7,262,393 | B2 * | 8/2007 | Ishii et al. | 219/725 |
| 7,283,399 | B2 * | 10/2007 | Ishii et al. | 365/185.24 |
| 2001/0005396 | A1 * | 6/2001 | Ishii | 375/229 |
| 2001/0005598 | A1 * | 6/2001 | Powell | 438/30 |
| 2002/0001207 | A1 * | 1/2002 | Kishimoto et al. | 363/59 |
| 2002/0034099 | A1 * | 3/2002 | Ishii et al. | 365/185.11 |
| 2002/0054511 | A1 * | 5/2002 | Ishii et al. | 365/185.24 |
| 2002/0136056 | A1 * | 9/2002 | Ishii et al. | 365/185.11 |
| 2002/0178443 | A1 * | 11/2002 | Ishii | 725/22 |
| 2003/0006089 | A1 * | 1/2003 | Ishii | 181/210 |
| 2003/0038645 | A1 * | 2/2003 | Ishii | 324/751 |
| 2003/0057206 | A1 * | 3/2003 | Ishii et al. | 219/725 |
| 2003/0088379 | A1 * | 5/2003 | Ishii | 702/117 |
| 2003/0156459 | A1 * | 8/2003 | Ishii et al. | 365/185.29 |
| 2004/0057316 | A1 * | 3/2004 | Kozakai et al. | 365/222 |
| 2004/0058149 | A1 * | 3/2004 | Zhou et al. | 428/328 |
| 2004/0114434 | A1 * | 6/2004 | Ishii et al. | 365/185.24 |
| 2004/0241924 | A1 * | 12/2004 | Chen et al. | 438/197 |
| 2005/0007860 | A1 * | 1/2005 | Kozakai et al. | 365/230.03 |
| 2005/0128493 | A1 * | 6/2005 | Nemoto et al. | 358/1.2 |
| 2005/0141300 | A1 * | 6/2005 | Kozakai et al. | 365/200 |
| 2005/0157550 | A1 * | 7/2005 | Ishii et al. | 365/185.01 |
| 2006/0088055 | A1 * | 4/2006 | Ishii | 370/468 |
| 2006/0114726 | A1 * | 6/2006 | Kozakai et al. | 365/185.29 |
| 2006/0120164 | A1 * | 6/2006 | Ishii et al. | 365/185.24 |
| 2006/0217108 | A1 * | 9/2006 | Ishii | 455/411 |
| 2006/0226872 | A1 * | 10/2006 | Ishii | 326/81 |
| 2006/0227090 | A1 * | 10/2006 | Ishii | 345/98 |
| 2006/0268610 | A1 * | 11/2006 | Ishii et al. | 365/185.12 |
| 2006/0274172 | A1 * | 12/2006 | Ishii | 348/294 |
| 2006/0284683 | A1 * | 12/2006 | Ishii | 330/295 |
| 2007/0058100 | A1 * | 3/2007 | Ishii | 349/43 |
| 2007/0060038 | A1 * | 3/2007 | Yamashita et al. | 454/248 |
| 2007/0085805 | A1 * | 4/2007 | Ishii et al. | 345/98 |
| 2007/0164282 | A1 * | 7/2007 | Ishii | 257/59 |
| 2007/0187366 | A1 * | 8/2007 | Ishii | 219/56.21 |
| 2007/0204927 | A1 * | 9/2007 | Yamashita et al. | 138/26 |
| 2007/0206418 | A1 * | 9/2007 | Kozakai et al. | 365/185.09 |
| 2007/0263156 | A1 * | 11/2007 | Ishii et al. | 349/143 |

FOREIGN PATENT DOCUMENTS

| JP | A-2001-290171 | 10/2001 |
|---|---|---|
| JP | 2004-109988 A | 4/2004 |

* cited by examiner

ELECTRO-OPTICAL DEVICE AND MANUFACTURING METHOD THEREOF, ELECTRONIC APPARATUS, AND CAPACITOR

BACKGROUND

1. Technical Field

The present invention relates to arts of an electro-optical device, such as a liquid crystal device, an electronic apparatus, such as a liquid crystal projector, including the electro-optical device, and a capacitor.

2. Related Art

In this type of electro-optical device, such as a liquid crystal device, a storage capacitor is often added parallel to a liquid crystal capacitor in order to prevent an image signal stored in a pixel portion from leaking.

A method of manufacturing a storage capacitor is disclosed in JP-A-2001-290171. In the manufacturing method according to JP-A-2001-290171, the distance between the edge of a contact hole with a wiring line above an upper electrode, which is connected to a lower electrode of a storage capacitor, and the upper electrode of the storage capacitor is set by means of two kinds of mask pattern, ensuring insulation.

However, if the storage capacitor is manufactured using two kinds of mask like the technique according to JP-A No. 2001-290171, it is necessary to ensure and design a margin in consideration of the alignment between the two kinds of mask, and the area of the storage capacitor should be decreased accordingly. As a result, there is a technical problem in that the capacity of the storage capacitor in the pixel portion may be lowered and display unevenness may occur.

SUMMARY

An advantage of the invention is that it provides an electro-optical device having a storage capacitor of increased area, and enabling high-definition image display, a manufacturing method thereof, an electronic apparatus, and a capacitor.

An electro-optical device of the invention includes, on a substrate: a plurality of scanning lines and a plurality of data lines which intersect one another; a plurality of pixel electrodes provided corresponding to the intersections of the plurality of scanning lines and the plurality of data lines; a storage capacitor in which a pair of electrodes, and a dielectric film are laminated; a sidewall made of a first insulating film provided on an inner wall of an opening which is opened through one of the pair of electrodes and the dielectric film; and a first conductive film which is arranged opposite to one of the pair of electrodes as viewed from the other of the pair of electrodes, and electrically connected to the other of the pair of electrodes via a self-alignment contact hole which is formed in a self-alignment manner simultaneously with the sidewall and surrounded by the sidewall.

According to the electro-optical device of the invention, during the operation thereof, active-matrix driving is possible, for example, when a pixel-switching thin-film transistor (hereinafter suitably referred to as "TFT") applies a data signal from a data line to a pixel electrode where a pixel is located and selected by a scanning line. At this time, the potential storage characteristics in the pixel electrode improve, and high contrast display can be attained, for example, by the storage capacitor electrically connected to the pixel electrode.

The "storage capacitor" according to the invention is, for example, a capacitor with g a pixel-potential-side electrode and a fixed-potential-side electrode as a pair of electrodes for improving the potential storage characteristics in the pixel electrodes. In this capacitor, the pixel-potential-side electrode, the dielectric film, and the fixed-potential-side electrode may be laminated in this order from the lower layer side, and may be laminated in reverse order. In addition, not only the storage capacitor electrically connected to the pixel electrode but also a storage capacitor provided on the substrate to operate the electro-optical device are included in the "storage capacitor" according to the invention.

Particularly in the invention, the electro-optical device includes the sidewall made of the first insulating film. The "sidewall" according to the invention means an insulating film provided on an inner wall of an opening which is bored through one of a pair of electrodes and a dielectric film. Furthermore, the other electrode (for example, a pixel-potential-side electrode or a lower electrode) of a pair of electrodes is electrically connected to a first conductive film, such as ITO (Indium-Tin Oxide), which constitute, for example, a pixel electrode which is arranged opposite to one (for example, a fixed-potential-side electrode or an upper electrode) of the pair of electrodes, via a self-alignment contact hole surrounded by this sidewall. Here, the first conductive film may extend from each of a plurality of pixel electrodes. In other words, even if the first conductive film is a film itself which constitutes each of a plurality of pixel electrodes, it may be formed integrally with each of a plurality of pixel electrodes, or it may be formed separately from the pixel electrodes. The "self-alignment contact hole surrounded by the sidewall" according to the invention means a self-alignment-type contact hole formed simultaneously with formation of the sidewall, and a contact hole whose periphery is surrounded and insulated by the sidewall so that electrical short circuiting (that is, short) is not caused between a pair of electrodes. For this reason, for example, the distance along a substrate between the first conductive film formed in the self-alignment contact hole and one of a pair of electrodes is defined by the sidewall. Therefore, positioning between a mask for forming a contact hole for establishing an electrical connection between the other of a pair of electrodes and one of the pair of electrodes and the first conductive film arranged opposite to one of the pair of electrodes while they does not make a short circuit, and a mask for forming a storage capacitor is not required. Accordingly, since it is not necessary to provide a margin in consideration of any positional deviation between a plurality of masks when the other of a pair of electrodes is electrically connected to the first conductive film arranged opposite to one of the pair of electrodes, the sidewall can be made as thin as possible. As a result, as compared with, for example, a case where a contact hole is formed using two kinds of mask, or a case where a contact hole adjacent to the storage capacitor is formed with an insulating film therebetween, the amount of decrease in the area of the storage capacitor caused by forming the contact hole can be reduced. That is, a larger storage capacitor can be formed on the substrate of the same size. Otherwise, the size of the substrate can be reduced.

In one aspect of the electro-optical device of the invention, the storage capacitor is configured such that a pixel-potential-side electrode electrically connected to the pixel electrodes and a fixed-potential-side electrode connected electrically to a constant potential, serving as the pair of electrodes, are laminated.

According to this aspect, the potential storage characteristics in the pixel electrode improve, and high contrast display can be attained, for example, by the storage capacitor electrically connected to the pixel electrode. Furthermore, since the pixel electrode and the pixel-potential-side electrode are electrically connected to each other via the self-alignment contact hole surrounded by the sidewall, as compared with, for example, a case where a contact hole is formed using two kinds of mask, or a case where a contact hole adjacent to the storage capacitor is formed with an insulating film therebetween, the amount of decrease in the area of the storage capacitor caused by forming the contact hole can be reduced. As a result, much higher contrast display can be attained.

In another aspect of the electro-optical device of the invention, the plurality of pixel electrodes extend from the first conductive film, the storage capacitor is configured such that the pixel-potential-side electrode, the dielectric film, and the fixed-potential-side electrode are laminated in this order, and the pixel-potential-side electrode as the other of the pair of electrodes is electrically connected to the plurality of pixel electrodes electrically via the self-alignment contact hole which is bored through the fixed-potential-side electrode as the one of the pair of electrodes and the dielectric film.

According to this aspect, the pixel-potential-side electrode is electrically connected to a pixel electrode extending from the first conductive film which is arranged opposite to the fixed-potential-side electrode, i.e., on the side of the upper layer of fixed-potential-side electrode, via the self-alignment contact hole which is bored through the fixed-potential-side electrode and the dielectric film. Thus, as compared with, for example, a case where a contact hole is formed using two kinds of mask, or a case where a contact hole adjacent to the storage capacitor is formed with an insulating film therebetween, the amount of decrease in the area of the storage capacitor caused by forming the contact hole can be reduced. As a result, much higher contrast display can be attained.

An electronic apparatus of the invention includes the above-mentioned electro-optical device (here, various aspects are also included) of the invention.

Since the electronic apparatus of the invention includes the above-mentioned electro-optical device of the invention, it is possible to realize various electronic apparatuses, such as projection type displays, television sets, portable telephones, electronic organizers, word processors, view-finder-type or monitor-direct-viewing-type video tape recorders, work stations, video phones, POS (Point of Sale) terminals, apparatuses having a touch panel, and the like, which are capable of performing high-quality image display. Further, as the electronic apparatus of the invention, it is also possible to realize, for example, an electrophoresis apparatus, such as an electronic paper, an electron emission apparatus (Field Emission Display and Conduction Electron-Emitter Display), and displays using the electrophoresis apparatus and the electron emission apparatus.

Particularly, since a larger storage capacitor can be formed on a substrate, for example, high-contrast display can be performed.

A method of manufacturing an electro-optical device of the invention is a method of manufacturing an electro-optical device including, on a substrate, a plurality of scanning lines and a plurality of data lines which intersect one another, a plurality of pixel electrodes provided corresponding to the intersections of the plurality of scanning lines and the plurality of data lines, and storage capacitors which are electrically connected to the plurality of pixel electrodes. The method includes: forming the storage capacitors such that a pixel-potential-side electrode, a dielectric film, and a fixed-potential-side electrode are laminated in this order; forming an interlayer insulating film on the storage capacitor; forming an opening which is bored through the fixed-potential-side electrode, the dielectric film, and the interlayer insulating film such that the pixel-potential-side electrode is exposed; laminating a first insulating film in a region including the opening, as seen in plan view, on the substrate; boring a self-alignment contact hole surrounded by a sidewall such that the pixel-potential-side electrode is exposed, while the sidewall made of the first insulating film is formed on the inner wall of the opening, by performing anisotropic etching on the first insulating film; and forming the pixel electrodes by laminating the first insulating film in the region including the self-alignment contact hole, as seen in plan view, on the substrate such that the first conductive film is electrically connected to the pixel-potential-side electrode via the self-alignment contact hole.

According to the method of manufacturing a liquid crystal device of the invention, the above-mentioned liquid crystal device can be manufactured. Here, positioning between a mask for forming a contact hole for electrically connecting the pixel-potential-side electrode with a pixel electrode extending from the first conductive film arranged opposite to the fixed-potential-side electrode and a mask for forming a storage capacitor is not required. As compared with, for example, a case where a contact hole is formed using two kinds of mask, or a case where a contact hole adjacent to the storage capacitor is formed with an insulating film therebetween, the amount of decrease in the area of the storage capacitor caused by forming the contact hole can be reduced. That is, a larger storage capacitor can be formed on the substrate of the same size. Otherwise, the size of the substrate can be reduced.

A capacitor according to the invention is formed by laminating a pair of electrodes, and a dielectric film on a substrate. The capacitor includes a sidewall made of an insulating film provided on an inner wall of an opening which is bored through one of the pair of electrodes and the dielectric film. The other of the pair of electrodes is electrically connected to a conductive film located opposite to the one of the pair of electrodes via a self-alignment contact hole surrounded by the sidewall.

According to the capacitor related to the invention, positioning between a mask for forming a contact hole for electrically connecting the other of a pair of electrodes with the conductive film located opposite to one of the pair of electrodes, and a mask for forming a storage capacitor is not required. Thus, as compared with, for example, a case where a contact hole is formed using two kinds of mask, or a case where a contact hole adjacent to the storage capacitor is formed with an insulating film therebetween, the amount of decrease in the area of the storage capacitor caused by forming the contact hole can be reduced. That is, a larger storage capacitor can be formed on the substrate of the same size. Otherwise, the size of the substrate can be reduced.

BRIEF DESCRIPTION OF THE DRAWINGS

The invention will be described with reference to the accompanying drawings, wherein like numbers reference like elements.

DESCRIPTION OF EXEMPLARY EMBODIMENTS

The effects and other advantages of the invention will be apparent from a best mode for carrying out the invention as will be described below.

Hereinafter, embodiments of the invention will be described with reference to the accompanying drawings. In the following embodiments, a liquid crystal device of a TFT active matrix drive system with a built-in drive circuit, which is an example of the electro-optical device of the invention, will be taken as an example.

First Embodiment

A liquid crystal device according to a first embodiment will be described with reference to FIGS. 1 to 8.

First, the entire configuration of the liquid crystal device according to this embodiment will be described with reference to FIGS. 1 and 2. Here, FIG. 1 is a plan view showing the configuration of the liquid crystal device according to this embodiment, and FIG. 2 is a sectional view taken along the line H-H' of FIG. 1.

Figure 1:
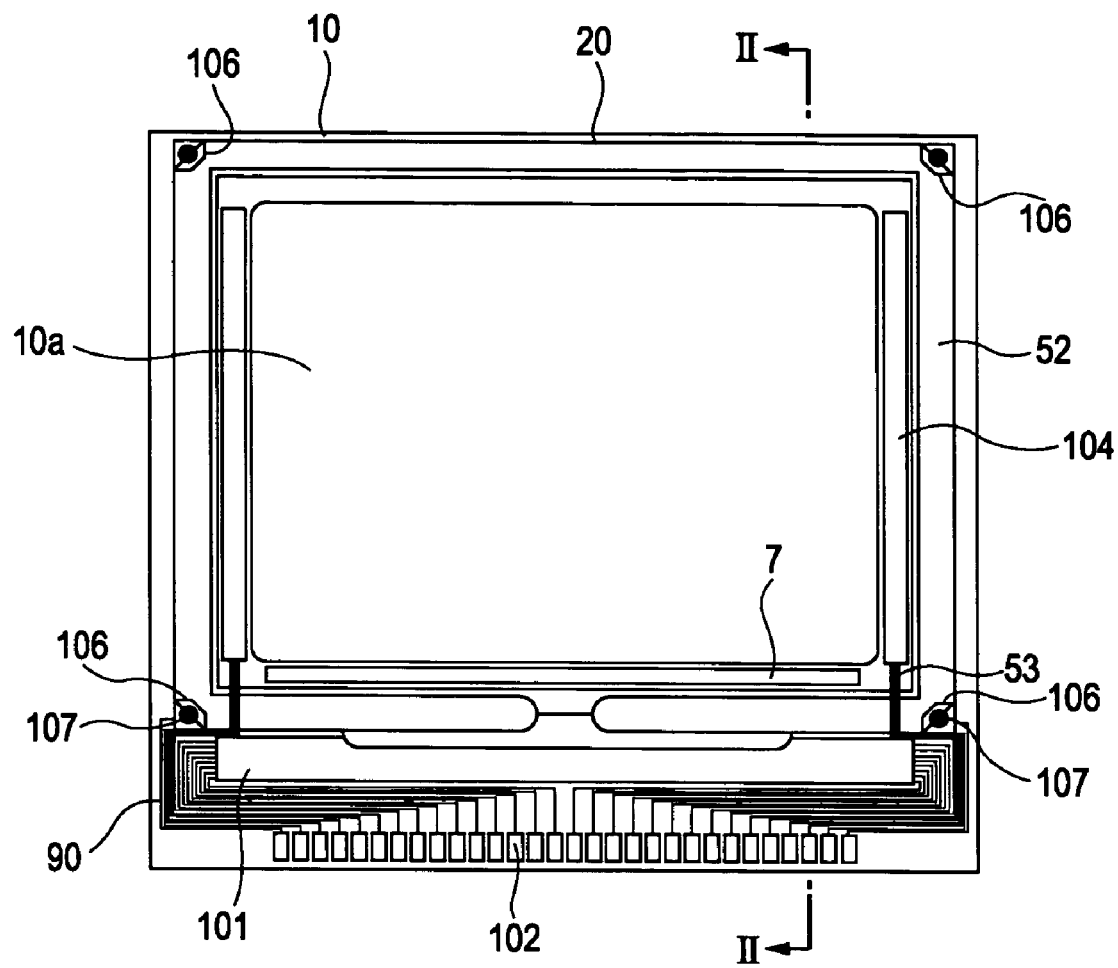
FIG. 1 is a plan view showing the entire configuration of a liquid crystal device according to a first embodiment.
Figure 2:
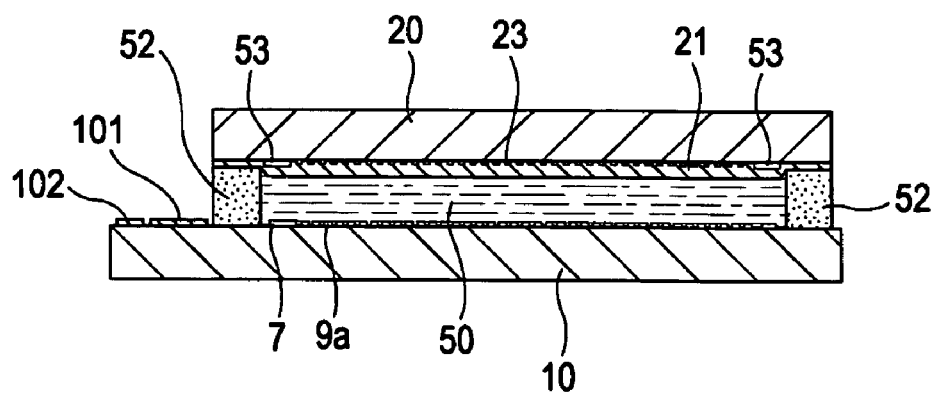
FIG. 2 is a sectional view taken along line H-H' of FIG. 1.

Referring to FIGS. 1 and 2, a TFT array substrate 10 and a counter substrate 20 are arranged to face each other in the liquid crystal device according to this embodiment. A liquid crystal layer 50 is enclosed between the TFT array substrate 10 and the counter substrate 20, and the TFT array substrate 10 and the counter substrate 20 are bonded to each other with sealant 52 provided in a seal region located around an image display region 10a.

Referring to FIG. 1, a frame-like light-shielding film 53 with a light blocking effect which defines a frame region of the image display region 10a is provided on the side of the counter substrate 20 parallel to the inside of the seal region where the sealant 52 is applied. A data line driving circuit 101 and an external circuit connecting terminal 102 are provided along one side of the TFT array substrate 10 in a peripheral region which is located outside the seal region where the sealant 52 is applied. Inside the seal region along this one side, a sampling circuit 7 is provided such that it is covered with the frame-like light-shielding film 53. Further, inside the seal region along the two sides adjacent to this one side, scanning line driving circuits 104 are provided such that they are covered with the frame-like light-shielding film 53. Further, on the TFT array substrate 10, vertical electrical connection terminals 106 for connection between both substrates are arranged in the regions which face four corners of the counter substrate 20 and are attached to both substrates with vertical electrical connection material 107. This makes it possible to establish electrical connection between the TFT array substrate 10 and the counter substrate 20.

On the TFT array substrate 10, lead-around wiring lines 90 for electrically connecting the external circuit connecting terminal 102, the data line driving circuit 101, the scanning line driving circuits 104, the vertical electrical connection terminals 106, and the like are formed.

Referring to FIG. 2, a laminated structure in which pixel-switching TFTs (Thin-Film Transistors) which are driver elements, and wiring lines, such as scanning lines and data lines, are provided is formed on the TFT array substrate 10. In the image display region 10a, pixel electrodes 9a are provided on the upper layer of the pixel-switching TFTs, and the wiring lines, such as scanning lines and data lines. On the other hand, a light-shielding film 23 is formed on the surface of the counter substrate 20 facing the TFT array substrate 10. On the light-shielding film 23, a counter electrode 21 made of transparent materials, such as ITO (Indium-Tin Oxide), is formed so as to face a plurality of pixel electrodes 9a. Further, the liquid crystal layer 50 is made of, for example, liquid crystal in which one or several kinds of nematic liquid crystal are mixed, and takes a predetermined aligned state between a pair of alignment films.

In addition, although not illustrated herein, test circuits, test patterns, etc. for testing the quality, defects, etc. of liquid crystal devices during manufacture or at the time of shipment, other than the data line driving circuit 101 and the scanning line driving circuits 104, may be formed on the TFT array substrate 10.

Next, the electric configuration in a pixel portion of the liquid crystal device according to this embodiment will be described with reference to FIG. 3. Here, FIG. 3 shows an equivalent circuit of various elements, wiring lines, etc. in a plurality of pixel portions which are formed in a matrix and which constitute the image display region of the liquid crystal device.

Figure 3:
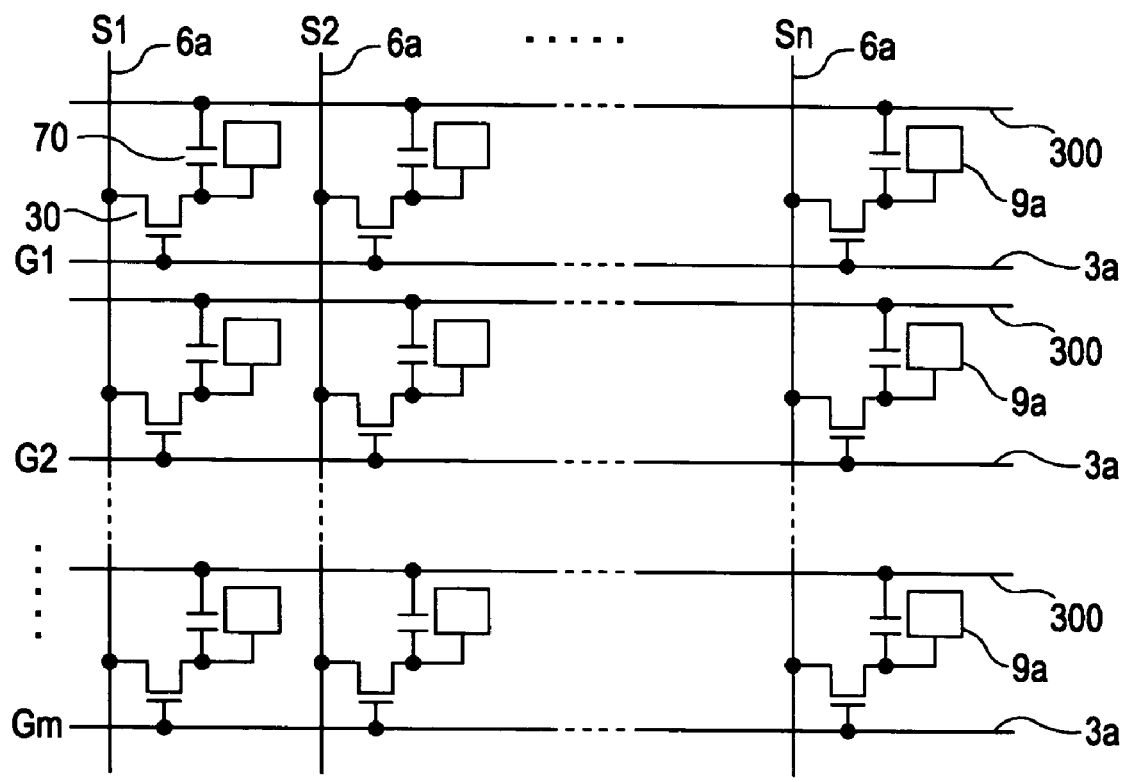
FIG. 3 shows an equivalent circuit of various elements, wiring lines, etc. in a plurality of pixel portions which are formed in a matrix and which constitute an image display region of the liquid crystal device.

Referring to FIG. 3, in each of the plurality of pixel portions formed in a matrix in the image display region 10a (refer to FIG. 1) of the liquid crystal device according to this embodiment, a pixel electrode 9a and a TFT 30 for controlling switching of the pixel electrode 9a are formed, and a data line 6a to which an image signal S1, S2, . . . , or Sn as will be described below is supplied is electrically connected to the source of the TFT 30.

Further, scanning lines 3a are electrically connected to the gates of the TFTs 30, and they are configured to sequentially apply scanning signals G1, G2, . . . , and Gm in this order to the scanning lines 3a in pulses with predetermined timing. The pixel electrodes 9 are electrically connected to the drains of the TFTs 30 to write the pixel signals S1, S2, . . . , and Sn supplied from the data lines 6a in the respective pixels with predetermined timing by switching on the TFTs 30 which are switching elements for a certain period.

Predetermined levels of the pixel signals S1 S2, . . . , and Sn written in the liquid crystal as an electro-optical material through the pixel electrodes 9a are maintained for a certain period between the TFT array substrate and the counter electrode 21 formed in the counter substrate. When the alignment and order of a molecular assembly change depending on the level of voltage applied, liquid crystal modulates light, enabling grayscale display. If an electro-optical device is in a normally white mode, the transmittance to incident light decreases according to voltage applied in units of pixels, and if the electro-optical device is in a normally black mode, the transmittance to incident light increases according to voltage applied in units of pixels. As a result, light with a contrast according to image signals is emitted from the whole electro-optical device.

Here, in order to prevent the maintained pixel signals S1, S2, . . . , and Sn from leaking, a storage capacitor 70 is added parallel to a liquid crystal capacitor which is formed between each of the pixel electrodes 9a and the counter electrode 21 (refer to FIGS. 1 and 2). This storage capacitor 70 includes a capacitor line 300 which is provided parallel to a scanning line 3a, and includes a fixed-potential-side capacitor electrode and is set to a predetermined potential. This storage capacitor 70 improves the charge storage characteristics in each of the pixel electrodes. In addition, the potential of the capacitor line 300 may be always fixed to one voltage, or the potential may be fixed to a plurality of voltages while it varies in predetermined cycles.

Figure 4:
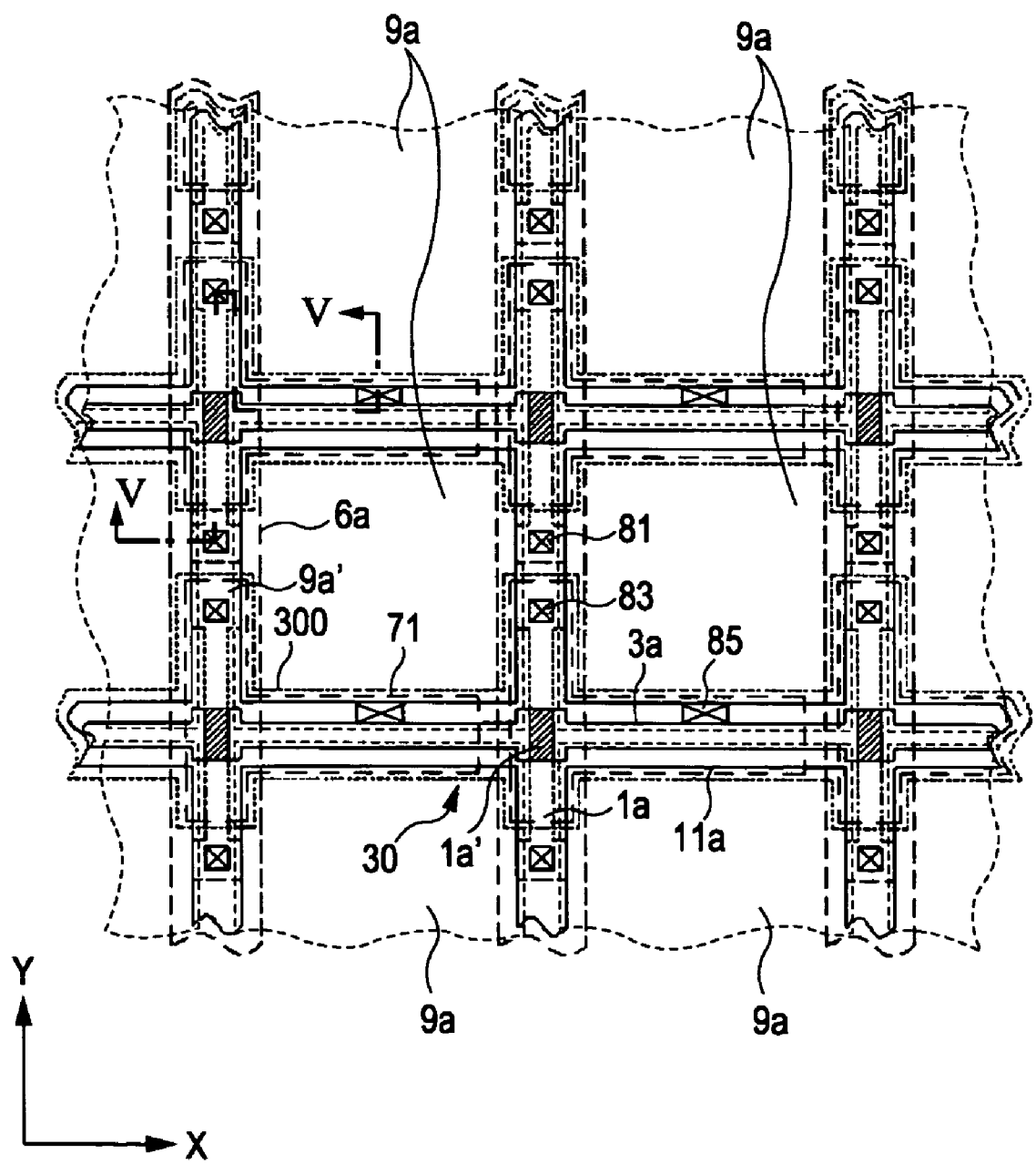
FIG. 4 is a plan view of a plurality of mutually adjacent pixel portions in the liquid crystal device according to the first embodiment.
Figure 5:
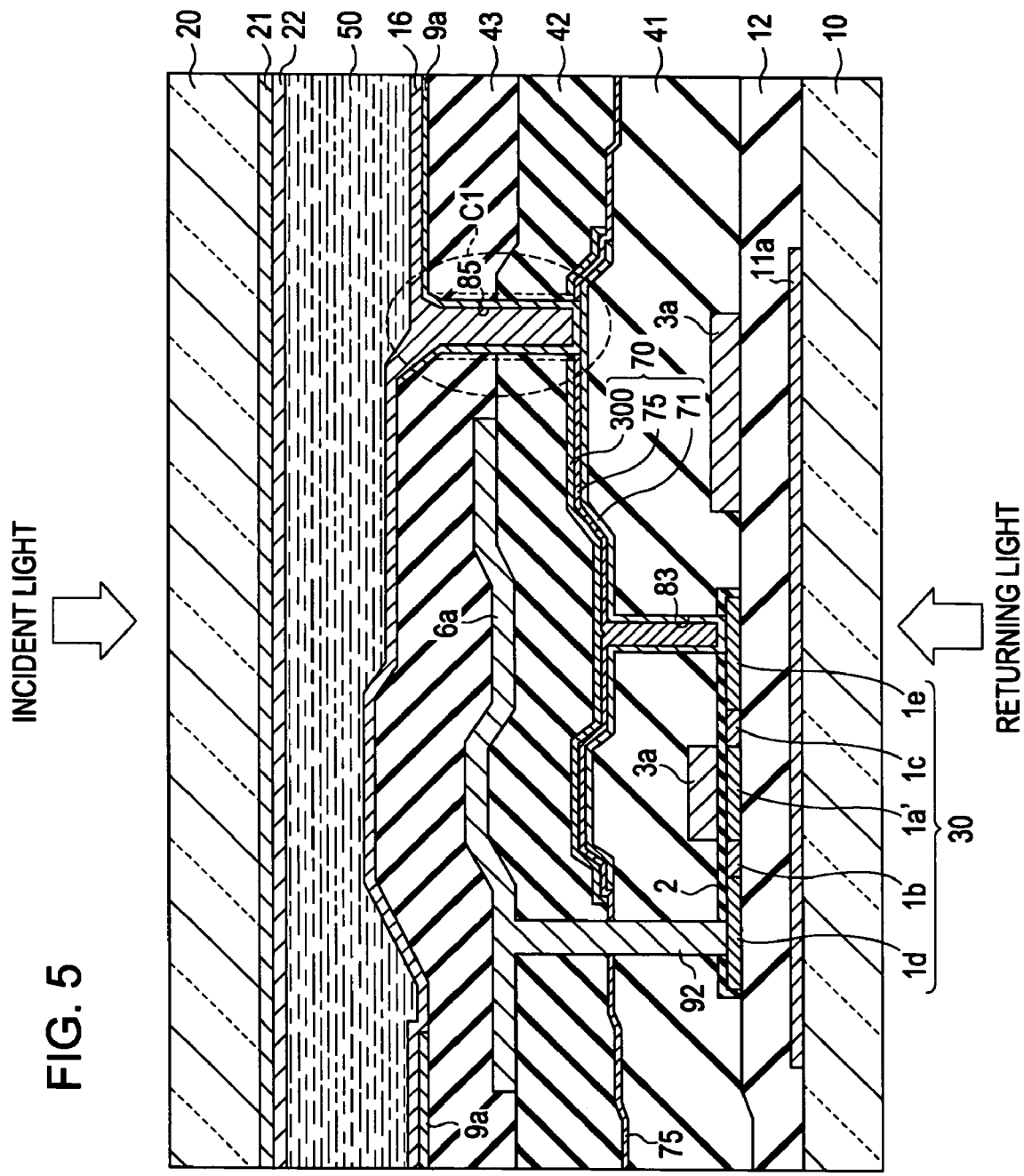
FIG. 5 is a sectional view taken along a line A-A' in FIG. 4.

Next, the concrete configuration of a pixel portion in which the circuit operations as described above are implemented will be described with reference to FIGS. 4 and 5. Here, FIG. 4 is a plan view showing the configuration of the liquid crystal device according to this embodiment, and FIG. 5 is a sectional view taken along the line A-A' of FIG. 4. In addition, scales of individual layers and members in FIG. 5 are made different from each other so that the individual layers and members have recognizable sizes in the drawing.

Referring to FIG. 4, a plurality of pixel electrodes 9a are provided in a matrix on the TFT array substrate 10 (their contours are shown by dotted-line portions 9a'), and the data lines 6a and the scanning lines 3a are provided along vertical and horizontal boundaries of the pixel electrodes 9a, respectively. The data lines 6a are made of, for example, a metallic film or an alloy film, such as an aluminum film, and the scanning lines 3a are made of, for example, a conductive polysilicon film. Further, each scanning line 3a is arranged so as to face a channel region 1a' of a semiconductor layer 1a marked by hatched line in the drawing, and this scanning line 3a functions as a gate electrode. That is, the pixel-switching TFTs 30 in which a main line portion of each scanning line 3a, serving as a gate electrode, is arranged to face the channel region 1a' are provided at intersecting points of the scanning lines 3a and the data lines 6a.

As shown in FIG. 5, the liquid crystal device according to this embodiment includes a transparent TFT array substrate 10 and a transparent counter substrate 20 arranged to face the array substrate. The TFT array substrate 10 is, for example, a quartz substrate, a glass substrate, or a silicon substrate, and the counter substrate 20 is, for example, a glass substrate or a quartz substrate. The TFT array substrate 10 is provided with pixel electrodes 9a, and an alignment film 16 which has been subjected to predetermined aligning treatment, such as rubbing treatment, is provided on the pixel electrodes. Among these, the pixel electrodes 9a are made of, for example, transparent conductive films, such as an ITO (Indium-Tin Oxide) film. The counter substrate 20 is provided over the entire surface of the TFT array substrate 10 with a pixel electrode 21, and an alignment film 22 which has been subjected to predetermined aligning treatment, such as rubbing treatment, is provided under the counter electrode. Among these, the counter electrode 21 is made of, for example, transparent conductive films, such as an ITO film, similarly to the above-mentioned pixel electrodes 9a, and the alignment films 16 and 22 are for example, transparent organic films, such as a polyimide film. The liquid crystal layer 50 takes a predetermined aligned state caused by the alignment films 16 and 22 in a state where an electric field from the pixel electrodes 9a is not applied.

As shown in FIG. 5, each TFT 30 has an LDD (Lightly Doped Drain) structure, and it includes, as its components, a channel region 1a' of a semiconductor layer 1a whose channel is formed by an electrical field from a scanning line 3a which functions as a gate electrode as described above, for example, a scanning line 3a made of a polysilicon film; a gate insulating film 2 including a gate insulating film which insulates the scanning line 3a from the semiconductor layer 1a; and a lightly doped source region 1b, a lightly doped drain region 1c, a highly doped drain region 1d, and a highly doped source region 1e in the semiconductor layer 1a.

In addition, although the TFT 30 preferably has the LDD structure as shown in FIG. 5, the TFT may have an offset structure in which impurities are not implanted into the lightly doped source region 1b and the lightly doped drain region 1c, or may be a self-alignment-type TFT in which impurities are implanted in high concentrations by using a gate electrode composed of a part of the scanning line 3a as a mask to form a highly doped source region and a highly doped drain region in a self-alignment manner. Further, although a single-gate structure in which only one gate electrode of the pixel-switching TFT 30 is arranged between the highly doped source region 1d and the highly doped drain region 1e has been described in this embodiment, two or more gate electrodes may be arranged therebetween. In this way, if a TFT is constituted with dual gates or triple gates, leak of a current at junctions between a channel and source and drain regions can be prevented, and the current at the time of OFF can be reduced. Furthermore, the semiconductor layer 1a which constitutes the TFT 30 may also be a non-single-crystal layer or a single-crystal layer. Known methods, such as a bonding method, can be used for formation of the single-crystal layer. By making the semiconductor layer 1a into a single-crystal layer, particularly the performance of a peripheral circuit can be enhanced.

In the meantime, in FIG. 5, a storage capacitor 70 is formed by arranging a relay layer 71 as a pixel-potential-side capacitor electrode, which is connected to the highly doped drain region 1e and the pixel electrode 9a of the TFT 30, and a part of a capacitor line 300 as a fixed-potential-side capacitor electrode so that they face each other with a dielectric film 75 therebetween.

The capacitor line 300 is made of a metal, an alloy, metal silicide, polysilicide, and laminates thereof, which contain at least one of, for example, high-melting-point metals, such as Ti (titanium), Cr (chromium), W (tungsten), Ta (tantalum), and Mo (molybdenum). Alternatively, the capacitor line may be made of an Al (aluminum) film.

The relay layer 71 is made of, for example, a conductive polysilicon film, and functions as a pixel-potential-side capacitor electrode. However, the relay layer 71 may be made of a single-layer film or a multilayer film containing a metal or an alloy similarly to the capacitor line 300 as will be described below. The relay layer 71 has a function of relay-connecting the pixel electrodes 9a and the highly doped drain region 1e of the TFT 30 via contact holes 83 and 85 in addition to its function as a pixel-potential-side capacitor electrode. In particular, the contact hole 85 is a self-alignment contact hole surrounded by sidewalls as will be described in detail below.

The capacitor line 300 functions as a fixed-potential-side capacitor electrode which is arranged to face the relay layer 71. When this capacitor line 300 is seen in plan view, as shown in FIG. 4, it is formed so as to overlap a formation area of a scanning line 3a. More specifically, the capacitor line 300 includes a main line portion extending along a scanning line 3a, and a protruding portion protruding upwardly along a data line 6a from each of the points where the capacitor line intersects data lines 6a in the drawing. Among these, a protruding portion contributes to an increase in the formation area of the storage capacitor 70 using a region on the scanning line 3a and a region under the data line 6a. Further, the capacitor line 300 preferably extends from an image display region 10a where a pixel electrode 9a is arranged in its periphery, and it is electrically connected to a constant-potential source so as to have a fixed potential. As such a constant-potential source, for example, constant-potential sources, such as a power source supplied to the data line driving circuit 101 are sufficient, and a counter electrode potential supplied to the counter electrode 21 of the counter substrate 20 is also available.

The dielectric film 75, as shown in FIG. 5, is made of silicon oxide films, such as a relatively thin HTO (High-Temperature Oxide) film with a film thickness of about 5 to 200 nm, and an LTO (Low-Temperature Oxide) film, or a silicon nitride film. As long as the reliability of a film is fully ensured from a viewpoint of increasing the capacity of the storage capacitor 70, a thinner dielectric film 75 is better.

As such, particularly in this embodiment, the relay layer 71 constitutes an example of "the other of a pair of electrodes" according to the invention, and the capacitor line 300 constitutes an example of "one of a pair of electrodes" according to the invention.

In FIGS. 4 and 5, in addition to the above, a lower light-shielding film 11a is provided below the TFT 30. The lower light-shielding film 11a is patterned in a lattice, which defines an opening region of each pixel. The lower light-shielding film 11a is made of single-layer films or multilayer films containing a metal or an alloy, similarly to the above-mentioned capacitor line 300. In addition, the opening regions are also defined by the data lines 6a in FIG. 4, and the capacitor lines 300 formed so as to intersect the data lines. Further, the lower light-shielding film 11a may also extend from the image display region to its periphery for connection with a constant-potential source in order to avoid fluctuation of the potential thereof which has an adverse effect on the TFTs 30, similarly to the case of the above-mentioned capacitor line 300.

Further, an underlying insulating film 12 is provided under the TFT 30. The underlying insulating film 12 has a function to prevent characteristic of the pixel-switching TFT 30 from changing due to roughness caused at the time of surface polishing of the TFT array substrate 10, dirt remaining after cleaning, etc. because it is formed over the entire TFT array substrate 10, in addition to the function in which it interlayer-insulates the TFT 30 from the lower light-shielding film 11a.

In addition, a first interlayer insulating film 41 through which a contact hole 81 which leads to the highly doped drain region 1e and a contact hole 83 which leads to the highly doped source region 1d are bored is formed on the scanning line 3a.

A relay layer 71 and a capacitor line 300 are formed on the first interlayer insulating film 41, and a second interlayer insulating film 42 through which a contact hole 81 which leads to the highly doped source region 1d and a contact hole 85 which leads to the relay layer 71 are bored, is formed on the relay layer and the capacitor line.

In addition, a data line 6a is formed on the second interlayer insulating film 42, and a third interlayer insulating film 43 through which a contact hole 85 which leads to the relay layer 71 is bored is formed on the data line.

Next, the electric connection between a storage capacitor and a pixel electrode will be described in detail with reference to mainly FIG. 6 in addition to FIG. 5. Here, FIG. 5 is a partially enlarged view showing that the inside of a broken-line circle C1 of FIG. 5 is enlarged. In addition, scales of individual layers and members in FIG. 6 are made different from each other so that the individual layers and members have recognizable sizes in the drawing.

Figure 6:
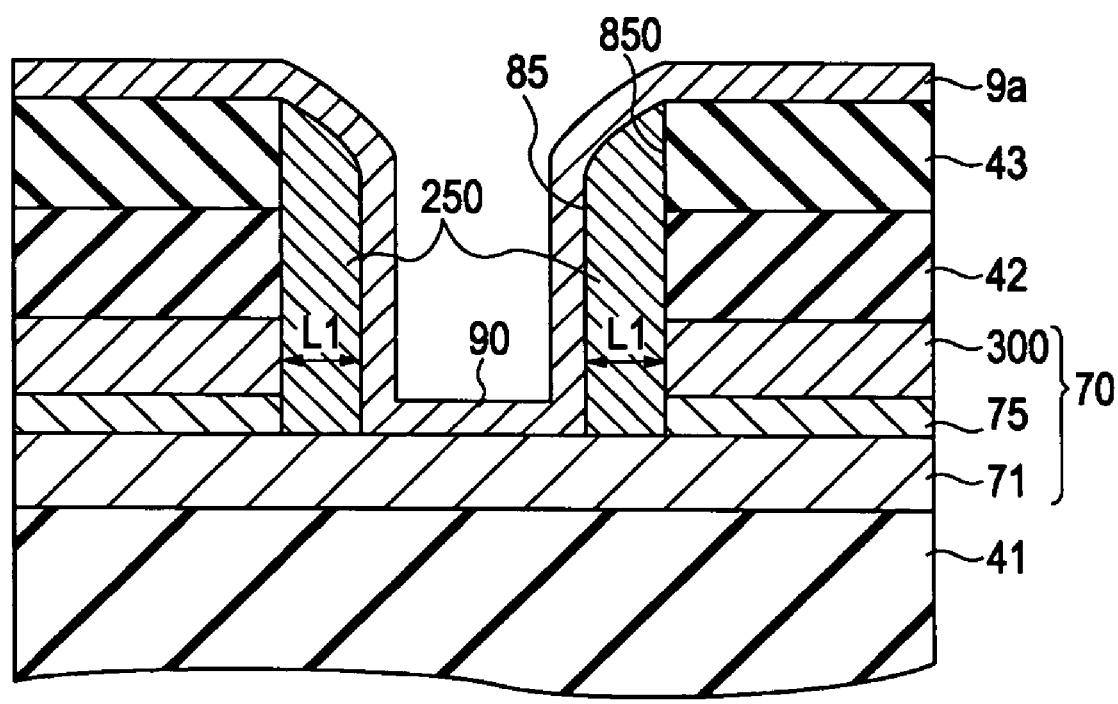
FIG. 6 is a partially enlarged view showing that the inside of the broken-line circle C1 of FIG. 5 is enlarged.

Referring to FIG. 6, the storage capacitor 70 is configured such that the relay layer 71 which functions as a pixel-potential-side capacitor electrode, the dielectric film 75, and the capacitor line 300 which functions as a fixed-potential-side capacitor electrode are laminated in this order on the first interlayer insulating film 41. The storage capacitor 70 is electrically connected to the pixel electrode 9a arranged on the side of the upper layer via the contact hole 85 which is bored through the second interlayer insulating film 42 and the third interlayer insulating film 43.

Particularly, this embodiment has a sidewall 250 made of an insulating film, and the contact hole 85 is surrounded by the sidewall 250.

The sidewall 250 is provided on the inner wall of an opening 850 which is opened through the third interlayer insulating film 43, the second interlayer insulating film 42, the capacitor line 300, and the dielectric film 75. Furthermore, the relay layer 71 as a pixel-potential-side capacitor electrode is electrically connected to a conductive film 90 which extends from the pixel electrode 9a arranged opposite the capacitor line 300 as a fixed-potential-side capacitor electrode (namely, on the side of the upper layer of the capacitor line 300) and made of ITO (Indium-Tin Oxide), etc., via the contact hole 85 surrounded by this sidewall 250.

The contact hole 85 is a self-alignment-type contact hole formed simultaneously with formation of the sidewall 250, and is surrounded by the sidewall 250 so that short circuiting (that is, short) is not caused between the capacitor line 300 as a fixed-potential-side capacitor electrode and the relay layer 71 as a pixel-potential-side capacitor electrode. For this reason, the distance L1 along the TFT array substrate 10 between the conductive film 90 formed in the contact hole 85 and the capacitor line 300 as a fixed-potential-side capacitor electrode is defined by the sidewall 250. Therefore, the relay layer 71 can be electrically connected to the conductive film 90 (i.e., pixel electrode 9a) located opposite (namely, on the side of the upper layer of the capacitor line 300) to the capacitor line 300 via the contact hole 85, while it does not make a short circuit with the capacitor line 300. Furthermore, since the contact hole 85 is a self-alignment-type contact hole, positioning between a mask for forming a contact hole and a mask for forming a storage capacitor is not required.

Accordingly, when the relay layer 71 is electrically connected to the conductive film 90 (i.e., pixel electrode 9a) located opposite (namely, on the side of the upper layer of the capacitor line 300) to the capacitor line 300, since it is not necessary to provide a margin in consideration of any positional deviation between a plurality of masks, the sidewall 250 can be made as thin as possible. As a result, as compared with, for example, a case where a contact hole is formed using two kinds of mask, or a case where a contact hole adjacent to the storage capacitor 70 is formed with an insulating film therebetween, the area of the storage capacitor 70 caused by forming the contact hole can be reduced. That is, a larger storage capacitor 70 can be formed on the TFT array substrate 10 of the same size. Otherwise, the size of the TFT array substrate 10 can be reduced.

Next, a manufacturing process of the liquid crystal device according to this embodiment will be described with reference to FIGS. 7 and 8. Here, FIGS. 7 and 8 are sectional views sequentially showing the laminated structure of the liquid crystal device in steps of the manufacturing process, with sections corresponding to those shown in FIG. 6. In addition, a manufacturing process of a contact hole for electric connection between the above-mentioned storage capacitor and pixel electrode in the liquid crystal device according to this embodiment will be described herein. In addition, description of the structure of individual layers to the first interlayer insulating film 41 is omitted.

Figure 7A:
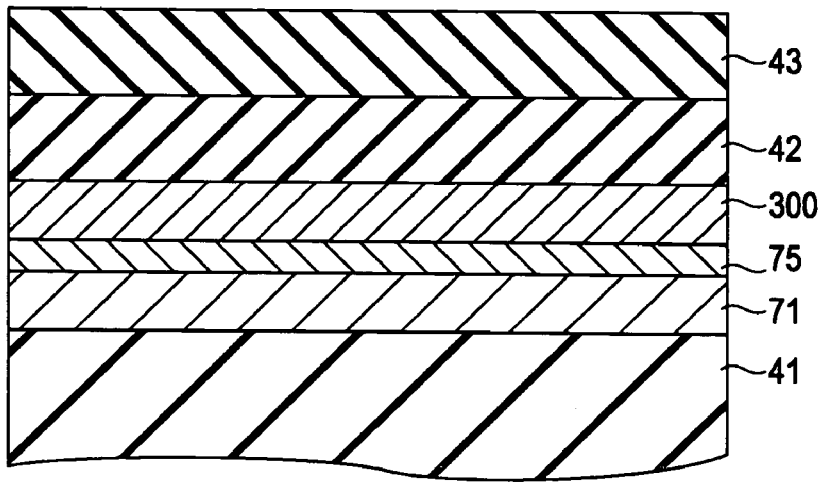
FIG. 7 is a process chart (Step 1) sequentially showing a manufacturing process of the liquid crystal device of the first embodiment.

First, in a step shown in FIG. 7A, a relay layer 71 as a pixel-potential-side capacitor electrode, a dielectric film 75, a capacitor line 300 as a fixed-potential-side capacitor electrode, a second interlayer insulating film 42, and a third interlayer insulating film 43 are laminated in order on the first interlayer insulating film 41.

Figure 7B:
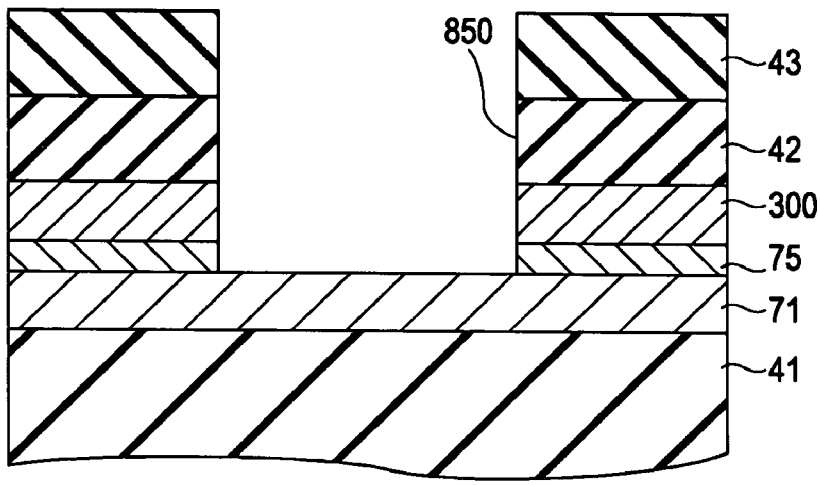

Next, in a step shown in FIG. 7B, an opening 850 which is opened through the third interlayer insulating film 43, the second interlayer insulating film 42, the capacitor line 300, and the dielectric film 75 is formed by etching, etc. At this time, the relay layer 71 is exposed.

Figure 7C:
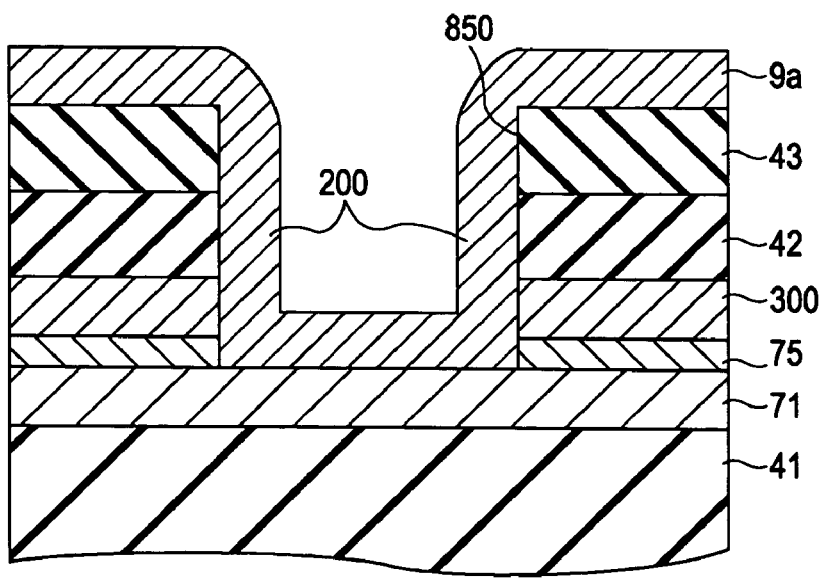

Next, in a step shown in FIG. 7C, an insulating film 200 is laminated in a region including the opening 850, as seen in plan view, on the TFT array substrate 10. At this time, the insulating film 200 is also formed on the inner wall of the opening 850, and this portion forms a sidewall 250 as will be described below.

Figure 8A:
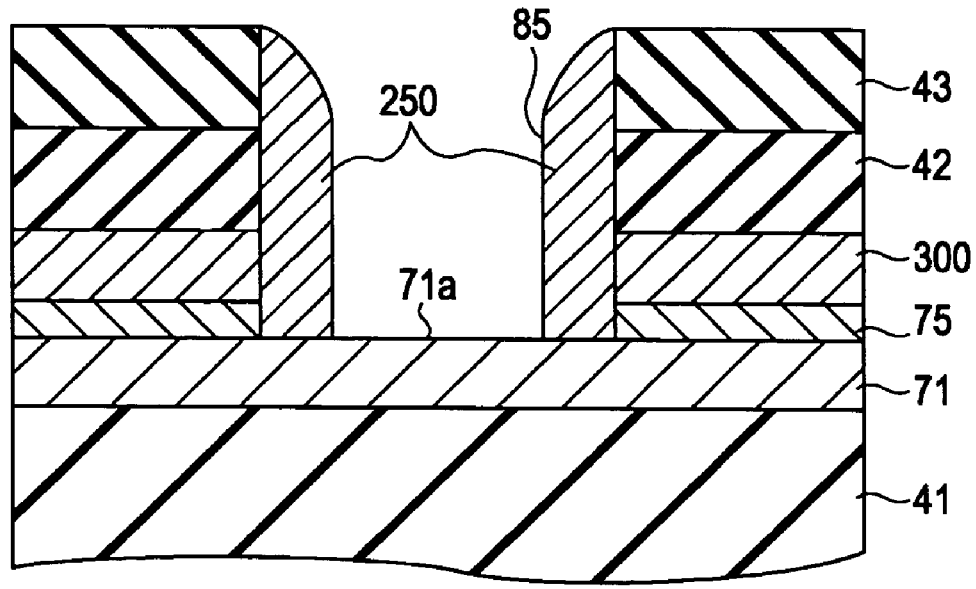
FIG. 8 is a process chart (Step 2) sequentially showing the manufacturing process of the liquid crystal device of the first embodiment.

Next, in a step shown in FIG. 8A, anisotropic etching is performed on the insulating film 200 in the region including the opening 850, as seen in plan view, on the TFT array substrate 10. At that time, since the etching rate at the bottom of the opening 850 corresponding to the depth direction of etching is higher than that at the inner wall surface of the opening 850, a surface 71a of the relay layer 71 can be exposed to the bottom of the opening 850, successfully leaving the insulating film 200 on the inner wall surface of the opening 850. That is, the relay layer 71 can be exposed, leaving the insulating film 200 on the inner wall of the opening 850, and successfully forming the sidewall 250. As a result, the self-alignment-type contact hole 85 surrounded by the sidewall 250 can be bored.

Figure 8B:
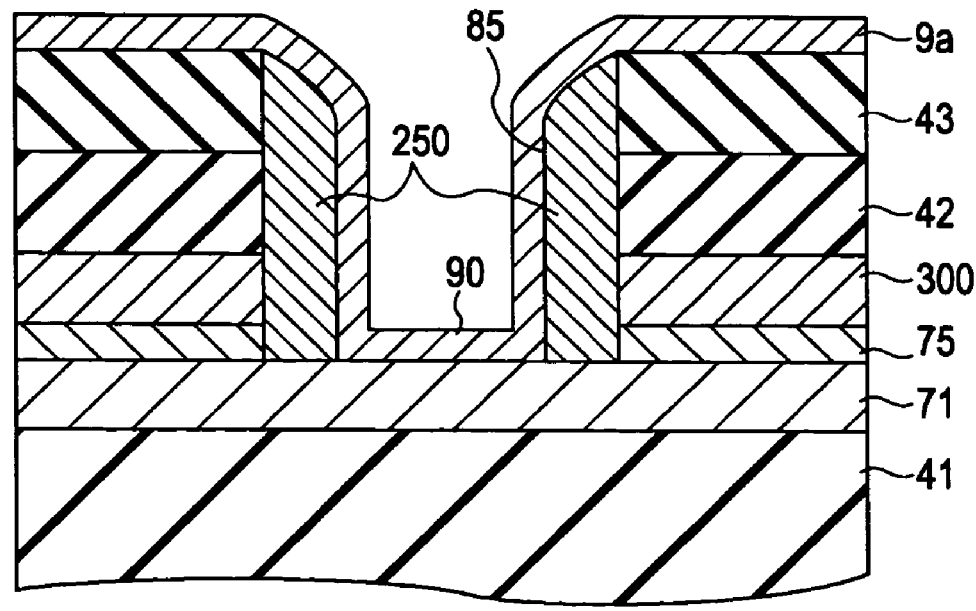

Next, in a step shown in FIG. 8B, a conductive film 90, such as ITO, is laminated on a region including a contact hole 85 and a region where a pixel electrode is to be formed. Thereby, a pixel electrode 9a is formed, and the pixel electrode 9a (i.e., conductive film 90) is electrically connected to the relay layer 71 via the self-alignment-type contact hole 85.

According to the method of manufacturing a liquid crystal device described above, the above-mentioned liquid crystal device of this embodiment can be manufactured. Particularly, since the contact hole 85 is a self-alignment-type contact hole, as compared with, for example, a case where a contact hole is formed using two kinds of mask, or a case where a contact hole adjacent to the storage capacitor 70 is formed with an insulating film therebetween, the amount of decrease in the area of the storage capacitor 70 caused by forming the contact hole can be reduced. That is, a larger storage capacitor 70 can be formed on the TFT array substrate 10 of the same size. Otherwise, the size of the TFT array substrate 10 can be reduced.

Second Embodiment

A liquid crystal device according to a second embodiment will be described with reference to FIGS. 9 and 10. Here, FIG. 5 is a sectional view according to the second embodiment similar to FIG. 5, and FIG. 10 is a partially enlarged view showing the inside of the broken-line circle C2 of FIG. 9 is enlarged.

Figure 9:
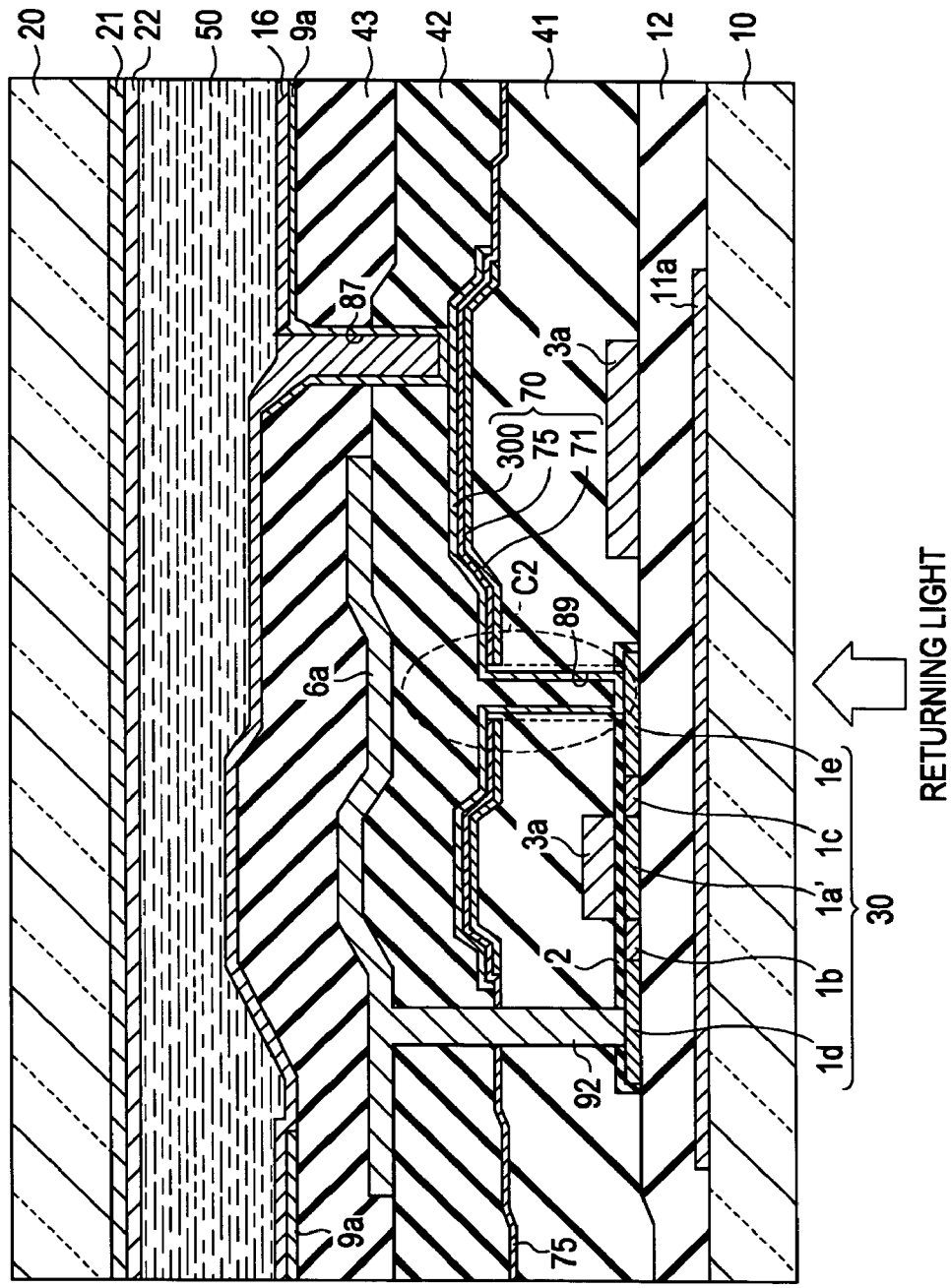
FIG. 9 is a sectional view according to a second embodiment similar to FIG. 5.
Figure 10:
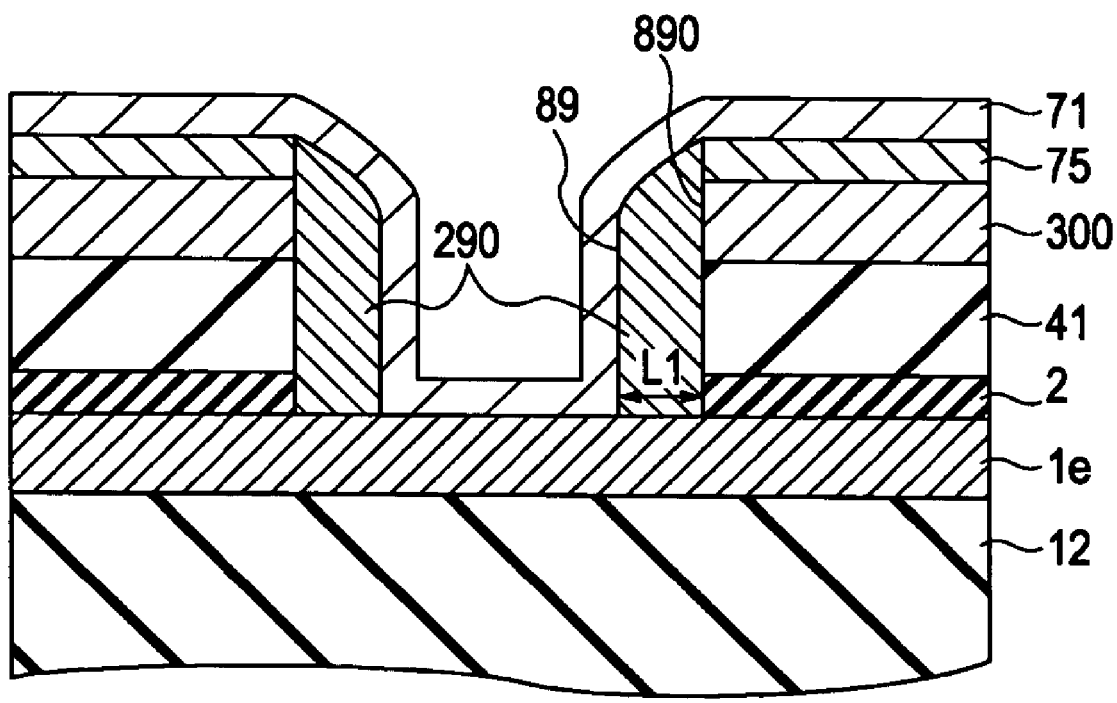
FIG. 10 is a partially enlarged view showing that the inside of the broken-line circle C2 of FIG. 9 is enlarged.

In addition, the same components in FIG. 9 and FIG. 10 as those according to the first embodiment shown in FIG. 1 to 8 are denoted by the same reference numerals, and the description thereof is omitted suitably. In addition, scales of individual layers and members in FIGS. 9 and 10 are made different from each other so that the individual layers and members have recognizable sizes in the drawing.

As shown in FIG. 9, the relay layer 71 may be arranged on the side of the upper layer of the capacitor line 300, and electrically connected to the drain region 1e of the TFT 30 via a self-alignment-type contact hole 89. In addition, the relay layer 71 and the pixel electrode 9a is electrically connected to each other via a contact hole 87 which is bored through the second interlayer insulating film 42 and the third interlayer insulating film 43.

As enlarged and shown in FIG. 10, the storage capacitor 70 is configured such that the capacitor line 300 which functions as a fixed-potential-side capacitor electrode, the dielectric film 75, and the relay layer 71 which functions as a pixel-potential-side capacitor electrode, are laminated in this order on the first interlayer insulating film 41. The storage capacitor 70 is electrically connected to the drain region 1e of the TFT 30 arranged on the side of the lower layer via the contact hole 89 which is bored through the dielectric film 75, the capacitor line 300, the first interlayer insulating film 41, and the insulating film 2.

As such, in this embodiment, the relay layer 71 constitutes an example of "one of a pair of electrodes" according to the invention, and the capacitor line 300 constitutes an example of "the other of a pair of electrodes" according to the invention.

Particularly, this embodiment has a sidewall 290 made of an insulating film, and the contact hole 89 is surrounded by the sidewall 290.

The sidewall 290 is provided on the inner wall of an opening 890 which is opened through the dielectric film 75, the capacitor line 300, the first interlayer insulating film 41, and the insulating film 2. Furthermore, the relay layer 71 as a pixel-potential-side capacitor electrode is electrically connected to the drain region 1e of the TFT 30 which is located opposite to the capacitor line 300 as a fixed-potential-side capacitor electrode (namely, on the side of the lower layer of the capacitor line 300) via the contact hole 89 surrounded by this sidewall 290.

The contact hole 89 is a self-alignment-type contact hole formed simultaneously with formation of the sidewall 290, and is surrounded by the sidewall 290 so that short circuiting (that is, short) is not caused between the capacitor line 300 as a fixed-potential-side capacitor electrode and the relay layer 71 as a pixel-potential-side capacitor electrode. For this reason, the distance L1 along the TFT array substrate 10 between the portion of the relay layer 71 formed in the contact hole 89, and the capacitor line 300 as a fixed-potential-side capacitor electrode is defined by the sidewall 290. Therefore, the relay layer 71 can be electrically connected to the drain region 1e of the TFT 30 located opposite (namely, on the side of the lower layer of the capacitor line 300) to the capacitor line 300 via the contact hole 89, while it does not make a short circuit with the capacitor line 300. Furthermore, since the contact hole 89 is a self-alignment-type contact hole, positioning between a mask for forming a contact hole and a mask for forming a storage capacitor is not required.

Accordingly, when the relay layer 71 is electrically connected to the drain region 1e of the TFT 30 located opposite (namely, on the side of the lower layer of the capacitor line 300) to the capacitor line 300, since it is not necessary to provide a margin in consideration of any positional deviation between a plurality of masks, the sidewall 290 can be made as thin as possible. As a result, as compared with, for example, a case where a contact hole is formed using two kinds of mask, or a case where a contact hole adjacent to the storage capacitor 70 is formed with an insulating film therebetween, the amount of decrease in the area of the storage capacitor 70 caused by forming the contact hole can be reduced. That is, a larger storage capacitor 70 can be formed on the TFT array substrate 10 of the same size. Otherwise, the size of the TFT array substrate 10 can be reduced.

Electronic Apparatus

Next, a case where the liquid crystal device which is the above-mentioned electro-optical device is applied to various kinds of electronic apparatuses will be described.

Figure 11:
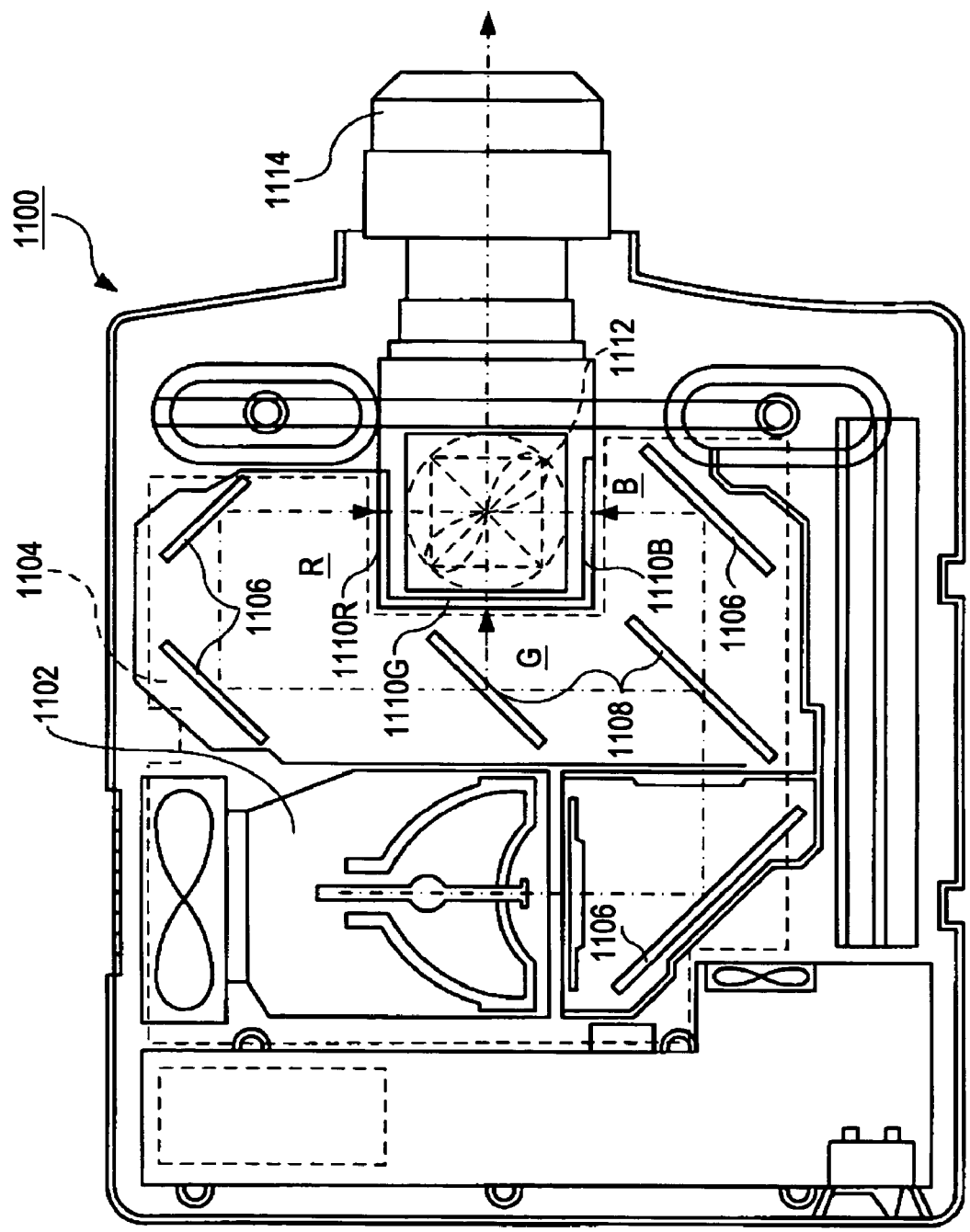
FIG. 11 is a plan view showing the configuration of a projector that is an example of an electronic apparatus to which the electro-optical device is applied.

First, a projector using this liquid crystal device as a light valve will be described. FIG. 11 is a plan view showing an example of configuration of the projector. As shown in FIG. 11, a lamp unit 1100 composed of a white light source, such as a halogen lamp, is provided inside the projector 1102. Projection light emitted from this lamp unit 1102 is separated into three primary colors of RGB by four mirrors 1106 and two dichroic mirrors 1108 which are arranged within a light guide 1104, and enters liquid crystal panels 1110R, 1110B, and 1110G as liquid crystal valves corresponding to the primary colors, respectively.

The configuration of the liquid crystal panels 1110R, 1110B, and 1110G is the same as the above-mentioned liquid crystal device, and the panels are driven by the primary color signals of R, G, and B which are supplied from an image signal processing circuit. The light modulated by these liquid crystal panels enters a dichroic prism 1112 from three directions. In the dichroic prism 1112, the red (R) and blue (B) light components are refracted by 90 degrees, while the green (G) light component goes straight. Accordingly, images of individual colors are synthesized, and consequently, a color image is projected onto a screen via a projector lens 1114.

Here, when attention is paid to a display image by each of the liquid crystal panels 1110R, 1110B, and 1110G, it is necessary to mirror-reverse a display image by the liquid crystal panel 1110G with respect to display images by the liquid crystal panels 1110R and 1110B.

In addition, since light components corresponding to primary colors of red (R), green (G) and blue (B), respectively, are incident onto the liquid crystal valves 100R, 100G, and 100B by the dichroic mirrors 1108, it is not necessary to provide any color filter.

Figure 12:
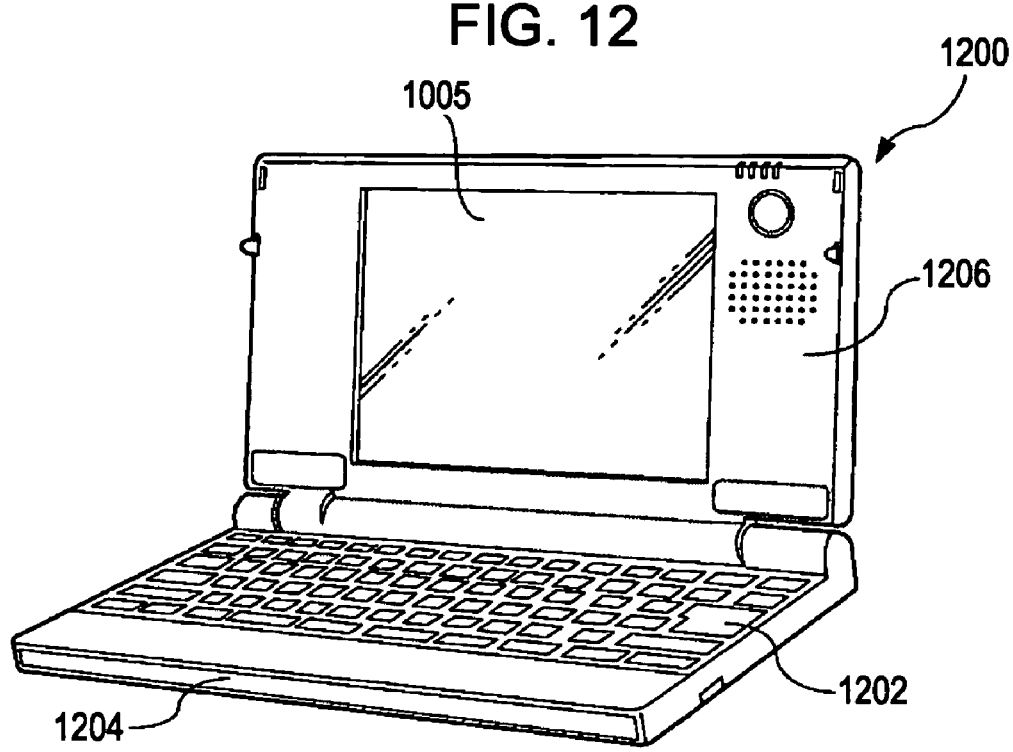
FIG. 12 is a perspective view showing the configuration of a personal computer which is an example of an electronic apparatus to which the electro-optical device is applied.

Next, an example in which liquid crystal device is applied to a mobile personal computer will be described. FIG. 12 is a perspective view showing the configuration of this personal computer. Referring to FIG. 12, the computer 1200 is composed of a main body 1204 provided with a keyboard 1202, and a liquid crystal display unit 1206. This liquid crystal display unit 1206 is constituted by adding a back light to the back of the above-mentioned liquid crystal device 1005.

Figure 13:
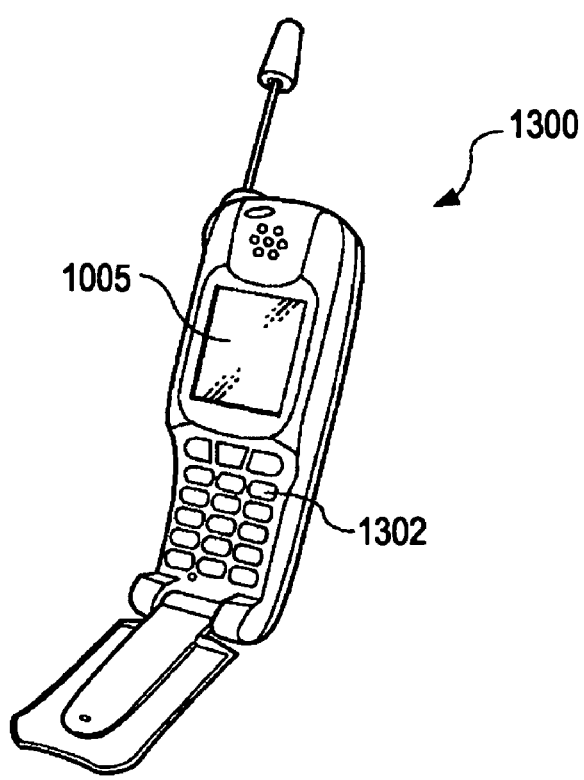
FIG. 13 is a plan view showing the configuration of a personal computer which is an example of an electronic apparatus to which the electro-optical device is applied.

Furthermore, an example in which the liquid crystal device is applied to a portable telephone will be described. FIG. 13 is a perspective view showing the configuration of this portable telephone. In FIG. 13, the portable telephone 1300 is provided with a reflective liquid crystal device 1005 along with a plurality of operation buttons 1302. The front of this reflective liquid crystal device 1005 is provided with a front light, if necessary.

In addition to the electronic apparatuses described above with reference to FIGS. 11 to 13, liquid crystal television sets, view-finder-type or monitor-direct-viewing-type video tape recorders, car navigation systems, pagers, electronic organizers, electronic calculators, word processors, work stations, video phones, POS (Point of Sale) terminals, apparatuses having a touch panel, and the like, can be exemplified. It is also needless to say that the liquid crystal device can be applied to these various electronic apparatuses.

Further, the invention can be applied to a reflective liquid crystal device (LCOS) which forms an element on a silicon substrate, a plasma display (PDP), a field emission type display (FED, SED), an organic EL display, a digital micromirror device (DMD), an electrophoresis device, etc, in addition to the liquid crystal device described in the above-mentioned embodiments.

The invention is not limited to the above-mentioned embodiments, but can be appropriately modified without departing from the subject matter and spirit of the invention read throughout the claims and specification. In accordance with such a modification, a method of manufacturing a substrate for an electro-optical device, a substrate for the electro-optical device, the electro-optical device, and an electronic apparatus including the same, a method of manufacturing a substrate for a semiconductor device, and a substrate for the semiconductor device also fall within the technical scope of the invention.

What is claimed is:

1. An electro-optical device comprising, on a substrate:
    a scanning line;
    a data line intersecting the scanning line;
    a pixel electrode provided corresponding to the intersection of the scanning line and the data line;
    a storage capacitor including a first electrode, a second electrode, and a dielectric film between the first and second electrodes, an opening being formed through the first electrode and the dielectric film;
    a sidewall made of a first insulating film provided on an inner wall of the opening through the first electrode and the dielectric film; and
    a first conductive film which is arranged on the opposite side of the first electrode as viewed from the second electrode and which is electrically connected to the second electrode via a self-alignment contact hole defined by an inner surface of the sidewall.

2. The electro-optical device according to claim 1, wherein the storage capacitor is configured such that a pixel-potential-side electrode electrically connected to the pixel electrode and a fixed-potential-side electrode connected electrically to a constant potential, serving as the second electrode and the first electrode, respectively, are laminated.

3. The electro-optical device according to claim 1, wherein the pixel electrode extends from the first conductive film, the storage capacitor is configured such that the second electrode, the dielectric film, and the first electrode are laminated in this order, and the second electrode is electrically connected to the pixel electrode electrically via the self-alignment contact hole which is bored through the first electrode.

4. An electronic apparatus comprising the electro-optical device according to claim 1.

5. A method of manufacturing an electro-optical device including, on a substrate, a plurality of scanning lines and a plurality of data lines which intersect one another, a plurality of pixel electrodes provided corresponding to the intersections of the plurality of scanning lines and the plurality of data lines, and storage capacitors which are electrically connected to the plurality of pixel electrodes, the method comprising:

forming the storage capacitors such that a pixel-potential-side electrode, a dielectric film, and a fixed-potential-side electrode are laminated in this order;

forming an interlayer insulating film on the storage capacitor;

forming an opening which is bored through the fixed-potential-side electrode, the dielectric film, and the interlayer insulating film such that the pixel-potential-side electrode is exposed;

laminating a first insulating film in a region including the opening, as seen in plan view, on the substrate;

boring a self-alignment contact hole surrounded by a sidewall such that the pixel-potential-side electrode is exposed, while the sidewall made of the first insulating film is formed on the inner wall of the opening, by performing anisotropic etching on the first insulating film; and forming the pixel electrodes by laminating the first insulating film in the region including the self-alignment contact hole, as seen in plan view, on the substrate such that the first conductive film is electrically connected to the pixel-potential-side electrode via the self-alignment contact hole.

* * * * *